April 21, 1970     C. PROCHNOW     3,507,203
SUPPORTING MEANS FOR PHOTOGRAPHIC CAMERAS
Filed Sept. 25, 1967
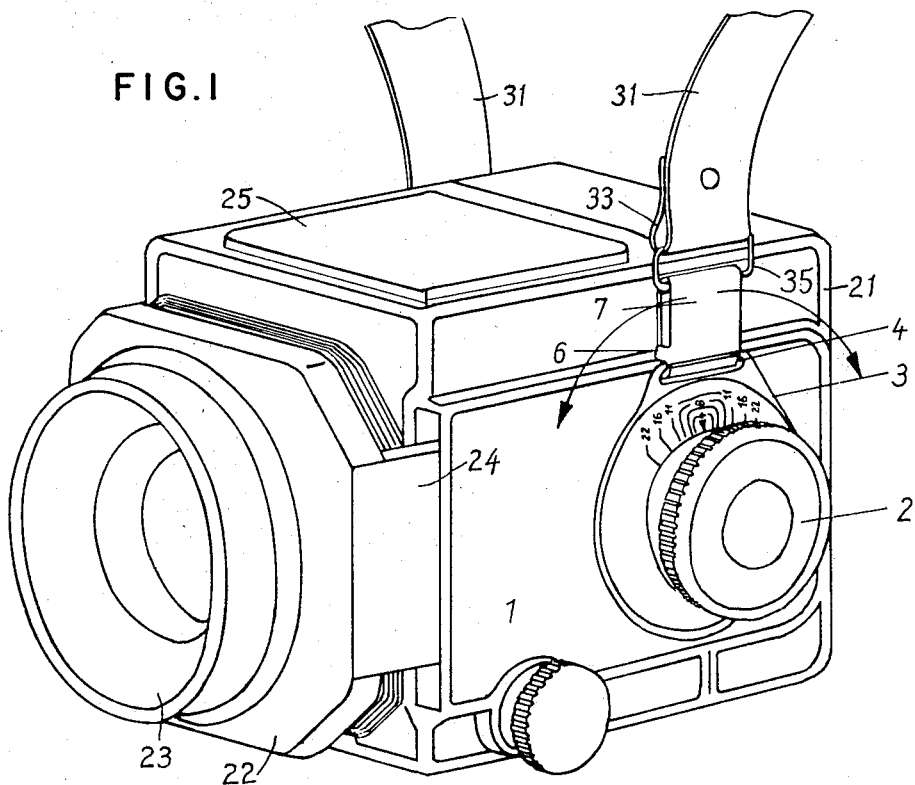
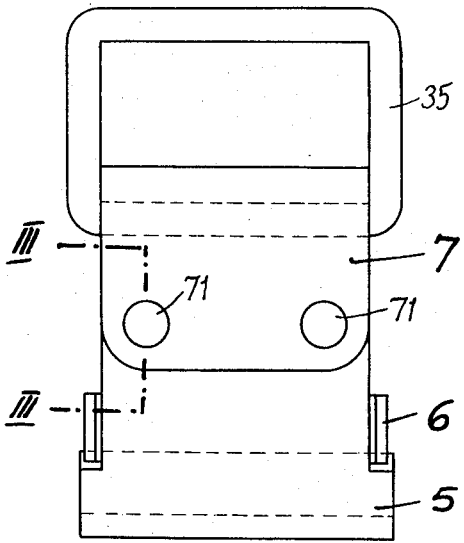
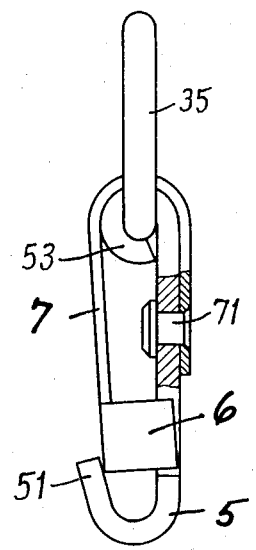

United States Patent Office 3,507,203
Patented Apr. 21, 1970

3,507,203
SUPPORTING MEANS FOR PHOTOGRAPHIC CAMERAS
Claus Prochnow, Braunschweig, Germany, assignor to Rollei-Werke Franke & Heidecke, Braunschweig, Germany, a German firm
Filed Sept. 25, 1967, Ser. No. 670,124
Claims priority, application Germany, Sept. 27, 1966, R 33,592
Int. Cl. G03b *17/56*
U.S. Cl. 95—86        7 Claims

ABSTRACT OF THE DISCLOSURE

There is disclosed a photographic camera having strap eyes mounted on opposite sides of the camera body and rotatable about a transverse horizontal axis preferably intersecting the longitudinal optical axis and also passing as near as reasonably possible through the center of gravity of the camera. The axis on which the strap eyes rotate is preferably concentric with the axis of rotation of the focusing knob of the camera. The supporting or carrying strap is connected to the rotatable strap eyes by connections which are elongated in a circumferential direction so that the connections can not twist in a circumferential direction relative to the eyes, and movements of the ends of the strap backwardly and forwardly relative to the camera body accompanied by turning the strap eyes relative to the camera body, rather than by twisting of the straps.

Background of the invention

The supporting straps of most cameras are attached to eyes or loops which are mounted in fixed position on the sides of the camera, near the top thereof. This is satisfactory for some types of cameras, but not for all. This conventional arrangement is particularly unsatisfactory for a certain relatively new type of single lens mirror reflex camera which is of elaborate precision construction and which includes a removable and replaceable film chamber or cassette at the back of the camera, and a front member which moves backwardly and forwardly for precision focusing and which also tilts upwardly and downwardly for producing special effects, and in which the front member carries interchangeable lenses. Such cameras, and others having some but not necessarily all of these features, are relatively heavy as compared with conventional cameras, and the strap arrangements used with conventional cameras are not satisfactory for these relatively heavy cameras of special design.

For the relatively heavy cameras of the kind just mentioned, the present invention is particularly suitable, as it enables the camera to be easily carried in any desired one of three positions, while still maintaining the supporting strap around the neck of the user, and without undesirable twisting of the lower ends of the strap. These positions are: (1) A position with the optical axis approximately horizontal, and with the back of the camera pressing against the chest of the user, this being the normal picture taking position where the user is able to look downwardly toward a focusing screen at the top of the camera. (2) A position with the optical axis extending approximately vertically, and with the lens pointing upward and the back of the camera downward. This is the most convenient position for changing the interchangeable lens, or for making necessary adjustments of diaphragm aperture, exposure time or shutter speed, etc., if such adjustments are made from the front of the camera. (3) A position in which the optical axis is approximately vertical, and in which the lens of the camera points downwardly and the back of the camera is upwardly. This is the most convenient position for opening the back of the camera, to replace the film in the cassette, or for removing the entire film cassette and replacing it with a different interchangeable cassette loaded with a different kind of film. The shifting from one to another of these three positions is easily possible with the present construction, using strap eyes which are rotatable about a transverse axis passing through or nearly through the center of gravity of the camera, and no twisting of the strap occurs, because the rotation of the camera body relative to the strap is accomplished by rotation of the strap eyes, rather than by twisting of the strap relative to the eyes.

Brief description of the drawings

In the accompanying drawings which are incorporated herein by reference and constitute a material part of the present disclosure, and which illustrate an exemplary embodiment of the invention:

FIG. 1 is a perspective view of a camera illustrating the supporting means of the present invention;

FIG. 2 is a side view of a snap hook for connecting the end of the strap to the rotatable strap eye; and FIG. 3 is an edge view of the snap hook shown in FIG. 2, with parts broken away and sectioned approximately on the line III—III of FIG. 2.

Description of a preferred embodiment

Although some features of the invention may be used with cameras of other types, the present invention is particularly designed for and particularly useful in connection with a camera of the kind indicated in FIG. 1, having a main body 1, a detachable rear section or film cassette section 21, a front member 22 movable forwardly and backwardly for focusing and also tiltable upwardly and downwardly, a detachable and interchangeable lens 23 carried by the front member 22, and supporting arms 24 extending rearwardly from opposite lateral edges of the front member 22 and passing into the camera body, wherein the arms 24 are arranged to be moved forwardly and backwardly for focusing purposes by turning the focusing knob 2 mounted on one side of the camera body, usually the left hand side. A cover 25 on the top of the camera body may be raised to expose a focusing screen of ground glass or equivalent. The camera here illustrated is what is called a single lens mirror reflex camera, with a mirror, not shown, within the camera body, so arranged that before the actual exposure is made, the light entering the lens 23, along the usual longitudinal optical axis, is reflected upwardly to form an image on the focusing screen at the top of the camera. When the picture is to be taken, the mirror is shifted by mechanism known per se, so that the light entering through the lens 23 may fall upon the film in the focal plane within the cassette 21.

The ends of the supporting strap 31 (which normally goes around the neck of the user) are operatively connected, according to the invention, to strap eyes or disks 3 and rotatable about a horizontal transverse axis intersecting or approximately intersecting the optical axis of the camera at right angles thereto, and passing through or as nearly as practicable through the center of gravity of the camera. Since the axis of rotation of the focusing knob 2, in this type of camera, passes approximately through the center of gravity although usually not exactly through the center of gravity, it is convenient to have the strap eyes 3 rotate concentrically about the focusing shaft. Thus the eye or disk member 3 on the left hand side wall of the camera (the near side as seen in FIG. 1) may rotate on the shaft of the focusing knob 2, or on a sleeve or bushing surrounding this shaft, while the other strap eye on the opposite side of the camera body (hidden from view in FIG. 1) rotates similarly about a short stub shaft which is alined with the shaft of the focusing knob 2, if this shaft does not go all the way through the camera body, or on the focusing shaft itself if it does pass all the way through the camera body.

The axis of rotation of the focusing knob 2 and its shaft is in a location determined by other factors than the center of gravity of the camera, such as the best location from the standpoint of other mechanism or parts within the camera body, and the location of the focal plane or film plane, and so the axis usually does not pass exactly through the center of gravity, but is close enough to it for practical purposes of the present invention and thus forms a convenient pivot point or location for the strap eyes according to the present invention. Moreover, it must be remembered that the center of gravity of the camera is not at a fixed point, in a camera of this type. As the focusing front 22 is moved rearwardly, the center of gravity moves somewhat rearwardly, and as the focusing front 22 is moved forwardly, the center of gravity moves forwardly. Moreover, when one replaces the interchangeable lens 23 with another lens of longer focal length, in a heavier mount, this will move the center of gravity forwardly, and when the lens is replaced by an interchangeable lens of shorter focal length and lighter mount, this will move the center of gravity rearwardly. Hence we are not talking about a fixed and invariable center of gravity. It is to be understood that, according to the invention, the axis of rotation of the strap eyes 3 is on a horizontal transverse axis which passes as nearly as possible through the center of gravity in the average location thereof.

The ends of the strap 31 are preferably doubled back upon themselves and riveted to form loops 33 as illustrated in FIG. 1, which loops receive the upper bars of stiff wire links 35 of rectangular shape as shown. The lower bars of these links 35 (see FIGS. 2 and 3, as well as FIG. 1) pass through the upper parts of rigid hook members 5 having hook portions 51 at their lower ends. Resilient latch flaps 7, riveted to the rigid hook members 5 at 71, have lateral ears 6 which tend to close the open sides of the hook portions 51. By pressing the resilient latch portions 7 toward the main body portions of the hook members 5, the hook portion 51 is opened so that it may be hooked into or released from the slot 4 in the upper part of the rotatable strap eye member 3 as illustrated in FIG. 1.

It will be noted especially from FIG. 1 that the slot 4 in the rotatable eye 3 is a straight slot of considerable length in a tangential or approximately circumferential direction relative to the rotatable eye member 3, and it will also be noted that the length of the hook portion 5, 51 of the connecting member is approximately equal to the length of the slot 4 and fits fairly snugly in this slot. The length of the slot and of the cooperating part of the connecting member is such that the connecting member 5 remains substantially radial relative to the rotatable eye member 3, and cannot cock or twist in a circumferential direction relative to the eye 3 to any substantial extent. Also, the lower edge of the link 35 is held snugly in a rolled barrel portion 53 at the top of the hook member 5, as best seen in FIG. 3, so it also is restrained against circumferential movement relative to the rotatable eye member or disk 3 and cannot twist circumferentially relative to the eye member. Hence there is little possibility of the strap 31 twisting relative to the eye 3. If the optical axis of the camera is to be swung upwardly or downwardly, this results in rotation of the eyes 3 on their rotary axes relative to the camera body, rather than twisting of the strap 31.

It may be desirable to use conventional stop means to limit rotation of the strap eyes 3 relative to the camera body 1, although in most cases such stop means is not necessary. If stop means is used, the rotation of the eyes 3 will normally be limited to approximately 180 degrees, 90 degrees each way from the central position illustrated in FIG. 1.

Although as above stated the axis of rotation of the strap eyes 3 ordinarily does not pass exactly through the center of gravity of the camera but only approximately through the center of gravity, nevertheless the axis is sufficiently close to the center of gravity so that the camera is carried (when supported by the strap 31) in a relatively stable position, remaining in whatever position it is set. This is due partly to the slight frictional resistance to turning of the strap eyes 3 relative to the camera body, and partly to the restraining effect of having the camera resting against the body of the person carrying the camera. For example, with the camera in the normal horizontal position (being the position shown in FIG. 1) the fact that the flat or approximately flat rear face of the camera rests against the chest of the person wearing the camera, tends to prevent the camera from tilting either upwardly or downwardly, and the stability is enhanced by the slight but nevertheless appreciable frictional resistance to turning the eyes 3 relative to the camera body. Thus even if the axis of rotation of the eyes 3 is somewhat in front of or somewhat behind the center of gravity, to a reasonable extent, the camera will nevertheless normally remain in the horizontal position ready for picture taking, with the back surface pressed against the chest of the person. But if the camera is grasped and turned 90 degrees clockwise from the position shown in FIG. 1, putting the lens at the top and the back of the camera at the bottom, then the approximately flat top surface of the camera will rest against the chest of the wearer, and again the camera will tend to remain stable in this new position, notwithstanding that the axis of rotation of the strap eyes may be somewhat behind the center of gravity (or below the center of gravity in this new position of the camera). This position is the most convenient one for changing lenses, or for making diaphragm adjustments or other adjustments which are to be made from the front of the camera. Similarly, if the camera is grasped and turned 90 degrees in a counterclockwise direction from the position shown in FIG. 1, this will place the lens downward and the back of the camera will be at the top, in the most convenient position for changing film or changing the entire cassette 21. The approximately flat bottom of the camera will then rest against the chest of the wearer, and again this contact with the wearer, plus the above mentioned frictional resistance, will tend to keep the camera stable in this position notwithstanding the fact that the axis of rotation of the eyes 3 may even be forwardly of the center of gravity (that is, below the center of gravity when the camera is in this new position). Of course if the axis of rotation of the eyes is slightly rearwardly of the center of gravity as is usually the case especially if the front member 22 is advanced to a forward position or if a long focal length lens is mounted on the front member 22, then the fact that the axis of rotation of the eyes 3 is behind the center of gravity will tend all the more to keep the camera in this last described position, with the lens pointing downwardly and with the camera back at the top.

As above indicated, the same rotatable strap eye arrangement is preferably used on both sides of the camera body. However, it may at times be desired to have this rotatable strap eye only on one side of the camera, and have the other end of the strap connected to the camera body by any conventional means. In such case, the end of the strap connected to the camera body by the conventional means would, of course, have to twist if the camera is tilted 90 degrees upwardly or 90 degrees downwardly from the horizontal position shown in FIG. 1, but the rotatable eye on one side wall of the camera would facilitate the desired upward or downward tilting of the camera.

It is to be understood that the disclosure is given by way of illustrative example only, rather than by way of limitation, and that without departing from the invention,

What is claimed is:

1. The combination with a photographic camera having side walls, a front lens through which an optical axis passes, a back wall, and a focusing knob rotatably mounted on a side wall of said camera for rotation about a transverse axis, of a supporting strap eye rotatably mounted on a side wall of said camera for rotation about an axis extending transversely through the camera in the vicinity of the center of gravity thereof, the transverse axis of rotation of said strap eye being substantially coincident with the axis of rotation of said focusing knob, and a supporting strap secured to said eye.

2. A construction as defined in claim 1, further including a second similar strap eye rotatably mounted on the opposite side wall of said camera from the first mentioned eye, both eyes being rotatable about the same transverse axis, said supporting strap having one end secured to one of said eyes and another end secured to the other of said eyes.

3. A construction as defined in claim 1, wherein said transversely extending axis of rotation of said eye is offset in the direction of said optical axis from said center of gravity, so that when supported from said eye, said camera tends to turn to a position wherein said optical axis is approximately vertical.

4. A construction as defined in claim 3, wherein said axis of rotation of said eye is offset rearwardly from said center of gravity, so that said camera tends to hang in a position with said lens downwardly and said back wall upwardly.

5. A construction as defined in claim 3, wherein said back wall of said camera is approximately flat and is adapted to rest against the chest of a person when the camera is supported by said strap extending around the neck of such person, the engagement of said back wall with such person tending to maintain the camera with said optical axis approximately horizontal and to resist swinging of the camera on said transversely extending axis.

6. A construction as defined in claim 1, wherein said strap eye has a slot elongated in the direction of the rotation of said eye, and wherein said strap is connected to said eye by a connecting hook engaged in said slot and elongated in the same direction so as to restrict tilting of said hook relative to said eye in the direction of rotation of said hook.

7. A construction as defined in claim 6, wherein said hook has a rigid hook portion having a width only slightly less than the length of said slot and adapted to fit snugly in said slot, and a resilient latch portion having a normal undisplaced position obstructing removal of said hook portion from said slot of said eye.

References Cited

UNITED STATES PATENTS

| | | | |
|---|---|---|---|
| 1,599,419 | 9/1926 | Klein | 24—73.15 |
| 2,860,556 | 11/1958 | Abbott | 95—86 |
| 2,889,095 | 6/1959 | Heidecke et al. | 224—5.22 |

FOREIGN PATENTS

| | | |
|---|---|---|
| 1,159,435 | 6/1958 | France. |
| 666,364 | 9/1938 | Germany. |

JOHN M. HORAN, Primary Examiner

R. W. ADAMS, Assistant Examiner